May 26, 1970  L. E. HOLLAND  3,513,556
TUBE MEASURING GAUGE
Filed April 4, 1968
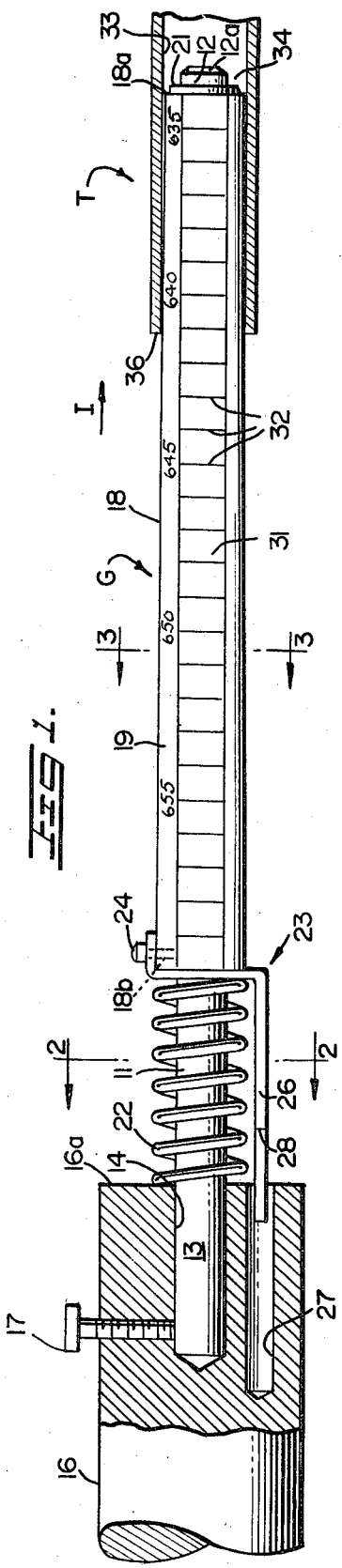
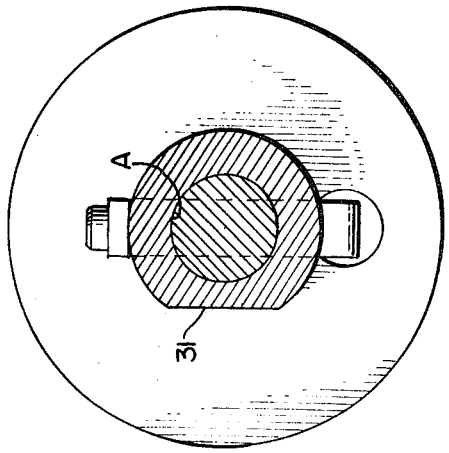
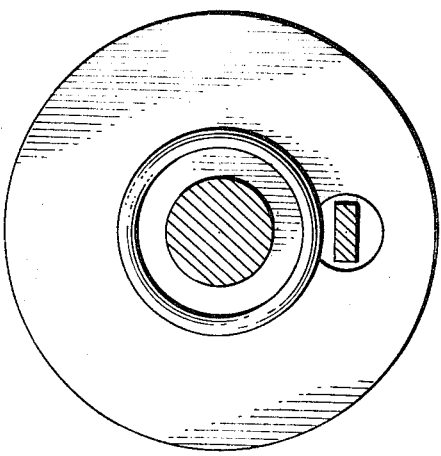
INVENTOR
LAWRENCE E. HOLLAND
T. Russell Foster
ATTORNEY

United States Patent Office 3,513,556
Patented May 26, 1970

3,513,556
TUBE MEASURING GAUGE
Lawrence E. Holland, Hartsville, S.C., assignor to Sonoco Products Company, Hartsville, S.C., a corporation of South Carolina
Filed Apr. 4, 1968, Ser. No. 718,681
Int. Cl. G01b 5/08
U.S. Cl. 33—178                           4 Claims

ABSTRACT OF THE DISCLOSURE

A gauge for measuring the inner diameter of a tube comprising a tapered sleeve slidably mounted on a rod and yieldingly spring loaded into a stop position which is moved into gripping engagement with the inner wall of a tube into which the sleeve is inserted to overcome the spring pressure and thereby provide an indication of the inner diameter of the tube by registration of the tube end with indicia on the outer surface of the sleeve.

---

This invention relates to a gauge and more particularly to a gauge for measuring the inner diameter of a tube.

In the manufacture of tubes and in particular spirally wound, multi-ply paper tubes, variations in the inner diameter of the tube occur which are unavoidable with the use of present-day tube winding techniques. Such paper tubes and in particular paper tubes used in the winding of textile material such as yarn are generally required to be fitted onto driving spindles or the like. In the winding of textile material, the arrangement for obtaining a driving connection between the spindle and the inner wall of the tube generally permits some variation in the tube inner diameter but with such present-day tube manufacturing techniques these variations occasionally exceed or fall below the permitted range of variations so that either a driving connection is not obtained or the tube does not fit onto the spindle. As is well known, in a paper tube production line, tube inner diameters can change quite unexpectedly from the permitted range of tolerances with the result that many defective tubes may be produced and shipped before the cause of the defect is observed and corrected. Since such tubes are sold in relatively large numbers and since such tubes are manufactured at a high production rate, the monitoring of the inner diameters of such tubes to maintain the desired size has posed a serious problem.

Accordingly, a primary object of this invention is to provide a new and novel gauge for measuring the inner diameter of a tube.

Another object of this invention is to provide a new and novel hand operated gauge which may be operated efficiently and quickly by an unskilled operator to measure variations in the inner diameter of paper tubes.

A further object of this invention is to provide a new and novel gauge for measuring the variations in the inner diameter of a paper tube which quickly indicates excessive variations in the tube diameter so as to permit corrective measures to be taken in a high speed tube production line.

This invention further contemplates the provision of a new and novel gauge for measuring variations in the inner diameter of paper tubes which is simple and inexpensive in construction, which may be used by a relatively unskilled operator and which is foolproof in operation.

Other objects and advantages of the invention will become apparent from the following description taken in connection with the accompanying drawing.

The objects stated above and other related objects of this invention are accomplished by providing a support rod on which a measuring sleeve is positioned in freely slidable concentric relationship therewith. The outer diameter of the sleeve is tapered radially outward from the front end of the sleeve and yieldable urging means are provided for urging the sleeve front end into engagement with stop means provided on the rod. Indicia are provided on the outer surface of the sleeve so that insertion of the sleeve into one end of the bore of a tube moves the sleeve into gripping engagement with the tube to overcome the urging means and move the rod forwardly relative to the sleeve whereupon the registration of the tube with the indicia provides a reading of the tube inner diameter.

The novel features which are believed to be characteristic of the invention are set forth with particularity in the appended claims. The invention itself, however, both as to its organization and operation may be best understood by reference to the following description taken in conjunction with the accompanying drawings in which:

FIG. 1 is a plan view partially in section of the gauge of the invention in association with a tube to be measured;

FIG. 2 is a sectional view taken substantially along line 2—2 of FIG. 1 in the direction of the arrows; and FIG. 3 is a sectional view taken substantially along line 3—3 of FIG. 1 in the direction of the arrows.

Referring now to the drawing and to FIG. 1 in particular, there is shown a gauge constructed in accordance with the invention and which is designated generally by the letter G. As will be explained in detail hereinafter, the gauge G is used to measure the inner diameter of a tube such as a paper tube designated generally in FIG. 1 by the letter T.

The gauge G includes a support rod 11 having a front end 12 and a rear end 13 which is preferably secured in a socket 14 of a handle 16 using suitable means such as a set screw 17. A measuring sleeve 18 having a central bore 19 is positioned on the rod 12 in freely slidable, concentric relationship therewith as shown best in FIG. 3 with the outer diameter of the sleeve tapered radially outward from the sleeve front end 18a to the sleeve rear end 18b to provide a rearwardly tapering outer surface 19.

Stop means are positioned on the rod 12 adjacent the rod outer end 12a for limiting the forward movement of the sleeve 18. More specifically, a washer 21 is positioned adjacent the rod end 12a within a suitable groove or the like which is arranged to be engaged by the sleeve front end 18a.

Means are provided for yieldingly urging the sleeve 18 forwardly on the rod 12 in the direction of the arrow I to yieldingly maintain the sleeve front end 18a into abutting engagement with the washer 21. More specifically, a coil spring 22 is positioned as shown in FIG. 1 in surrounding relationship with the rod 12 between the forward face 16a of the handle 16 and the rear end 18b of the sleeve 18.

Indexing means are associated with the rod 12 on the sleeve 18 for indicating the relative position of the sleeve 18 and rod 12 when the spring 22 is compressed during the use of the gauge G as will be explained hereinafter. More specifically, an L-shaped bracket designated generally by the numeral 23 is secured by suitable means such as a screw 24 to the sleeve 18 adjacent the sleeve rear end 18b for movement therewith. The bracket 23 includes an arm 26 which is receivable within a recess 27 provided in the handle 16 as shown. An indexing mark 28 which may be in the form of a groove or the like is provided on the arm 26 and the mark 28 is arranged to index with the forward face 16a of the handle 16 during the accommodation of the arm 26 in the handle recess 27.

Indicia are provided on the outer surface 19 of the sleeve 18 for indicating the inner diameter of the measured tube T. More specifically, a longitudinally extending flat 31, as shown in FIGS. 1, 3 is provided on the sleeve surface 19 and the flat 31 is provided with uniformly spaced graduations 32 such as grooves or the like corresponding to the inner diameter of the tubes to be measured. In the illustrated embodiment, the spacing between graduations 32 are in on-thousandths of an inch and, as one example where the tube T is to be produced with an inner diameter of 0.645 inch, numerical indicia are included with the graduations 32 for indicating tube inner diameters within the range of 0.635 to 0.655 inch as shown inscribed on the sleeve 18 in FIG. 1.

In the operation of the gauge G, the tube T to be measured has an inner wall 33 defining a central bore 34 and an end 36. The operator grasps the gauge handle 16 and the forward end of the gauge G is inserted into the tube bore 34. The gradually tapering outer surface 19 of the sleeve 18 permits the sleeve 18 to move into the tube bore 34 to the extent at which the tube inner wall 33 moves into snug-fitting or gripping engagement with the sleeve surface 19. When this gripping engagement has been established between the tube T and sleeve 18, further movement of the sleeve 18 within the tube bore 34 is restrained and the urging force of the spring 22 is overcome whereby the rod 12 moves further into the tube bore 34 relative to the sleeve 18.

As the wall of the paper tube T is relatively weak, the force required to compress the spring 22 is selected so that very little deformation if any of the tube occurs during the insertion of the gauge G into the tube bore 34 and before the spring 22 is compressed. As a further safeguard and to insure uniformity in the measurement of various tube diameters, the rod 12 is moved by the operator relative to the sleeve 18 and the spring 22 compressed until the mark 28 coincides with the handle front face 16a. A reading may then be taken either at that time or after the spring 22 has been permitted to expand and move the rod back to the position of FIG. 1 by observing the registration of the tube end 36 with the graduations 32 on the sleeve 18.

If, in the example given above, the tube inner diameter is smaller than the prescribed diameter of 0.645 inch, the tube end 36 will register with the graduations 32 at a point closer to the sleeve front end 18a than the graduation 0.645 as shown in FIG. 1 wherein a somewhat smaller diameter of 0.641 inch has been measured. Tube inner diameters which are larger than the prescribed diameter of 0.645 inch will therefore produce a reading greater than 0.645 inch as the sleeve 18 will enter the tube bore 34 to a greater distance with the tube end 36 registering with the graduation closer to the sleeve rear end 18b.

While there has been described what at present is considered to be the preferred embodiment of the invention, it will be understood by those skilled in the art that various changes and modifications may be made therein without departing from the invention.

Having thus described the invention, what is claimed is:

1. A gauge for measuring the inner diameter of a tube having a bore comprising, in combination, a support rod, a measuring sleeve positioned on said support rod in freely slidable, concentric relationship therewith, said sleeve having an outer diameter tapered radially outwardly from the front end of said sleeve, stop means on said rod adjacent the front end of said rod for limiting the forward movement of said sleeve on said rod, means for yieldingly urging said sleeve forwardly on said rod toward engagement with said stop means, and providing gauging pressure means to indicate the achievement of a desired gauging pressure including cooperating indices, one fixed relative to the sleeve, the other fixed relative to the rod diameter indicating indicia on the outer surface of said sleeve, said sleeve being arranged to be inserted into one end of the bore of a tube to produce a gripping engagement between the inner wall of said tube and said sleeve for overcoming said urging means and for moving said rod relative to said sleeve whereby the registration of said tube one end with said diameter indicating indicia provides a reading of the inner diameter of said tube when the cooperating indices are properly registered.

2. A gauge in accordance with claim 1 including a handle secured to the rear end of said rod and wherein said urging means include a coil spring surrounding said rod between said handle and the rear end of said sleeve.

3. A gauge in accordance with claim 1 wherein said indicating means include a bracket supported on said sleeve, said bracket having an arm extending rearwardly from said sleeve rear end and in parallel relationship with the axis of said rod, a recess in said handle, said recess being arranged to accommodate said arm during movement of said rod relative to said sleeve and said one index is a mark on said arm for indexing with said handle to indicate the relative position of said sleeve and said rod at which said readings are to be taken.

4. A gauge in accordance with claim 1 wherein said stop means include a washer positioned on said rod adjacent said rod outer end and including a handle and wherein said indicating means include a bracket supported on said sleeve, said bracket having an arm extending rearwardly from said sleeve rear end and in parallel relationship with the axis of said rod, a recess in said handle, said recess being arranged to accommodate said arm during the movement of said rod relative to said sleeve, said one mark is a mark on said arm for indexing with said handle to indicate the relative position of said sleeve and said rod at which said readings are to be taken, and said handle is secured to the rear end of said rod, and wherein said urging means include a coil spring surrounding said rod between said handle in the rear end of said sleeve, a longitudinally extending flat on the outer surface of said sleeve and wherein said diameter indicating indicia includes a plurality of uniformly spaced graduations on said flat for registration with said tube end.

References Cited

UNITED STATES PATENTS 2,617,201   11/1952   Davies _____ 33—178

FOREIGN PATENTS 588,788   1933   Germany.

LEONARD FORMAN, Primary Examiner

S. L. STEPHAN, Assistant Examiner

U.S. Cl. X.R.

33—162, 168